United States Patent [19]
Imao et al.

[11] Patent Number: 5,148,495
[45] Date of Patent: Sep. 15, 1992

[54] LINE REGION SEGMENTATION METHOD

[75] Inventors: Kaoru Imao, Yokohama; Satoshi Ohuchi, Tokyo, both of Japan

[73] Assignee: Ricoh Company, Ltd., Japan

[21] Appl. No.: 700,421

[22] Filed: May 15, 1991

[30] Foreign Application Priority Data

May 25, 1990 [JP] Japan ................................. 2-134054

[51] Int. Cl.$^5$ .............................................. G06K 9/34
[52] U.S. Cl. ....................................... 382/9; 358/452;
                                        358/462; 358/466; 382/50
[58] Field of Search ................ 382/9, 50, 48; 358/450,
                        358/452, 453, 462, 464, 465, 466, 72

[56] References Cited

U.S. PATENT DOCUMENTS

| | | | |
|---|---|---|---|
| 4,503,556 | 3/1985 | Scherl et al. | 382/9 |
| 4,750,209 | 6/1988 | Shimura et al. | 382/9 |
| 4,888,646 | 12/1989 | Umeda et al. | 382/9 |
| 5,014,124 | 5/1991 | Fujisawa | 358/462 |
| 5,025,481 | 6/1991 | Ohuchi | 382/9 |
| 5,038,381 | 8/1991 | Nelson | 382/9 |

FOREIGN PATENT DOCUMENTS 63-240175 10/1988 Japan .
2-140057 5/1990 Japan .

OTHER PUBLICATIONS

Nobuji Tetsutani et al, "Bilevel Rendition Method for Documents Including Gray-Scale and Bilevel Image," *Institute of Electronics and Communication Engineers* of Japan, (1984), vol. J67-B, No. 7, pp. 781-788.

*Primary Examiner*—Joseph Mancuso
*Attorney, Agent, or Firm*—Mason, Fenwick & Lawrence

[57] ABSTRACT

A line region segmentation method includes the steps of grouping pixels of an input image indicated by image signals into three sets of black, gray and white pixels, performing a pattern matching of black pixels in a region of the input image with a set of matrix patterns to determine if a black pixel is closely associated with other pixels and determine if a black pixel is one of screened black pixels for each pixel of the set of black pixels, deciding if the black pixel being considered is one of black bilevel pixels by checking the number of black pixels that are determined as being associated black pixels and as being non-screened black pixels, performing a pattern matching of white pixels in a region of the input image with a set of matrix patterns to determine if a white pixel is closely associated with other pixels for each pixel of the set of white pixels, deciding if the white pixel being considered is one of white bilevel pixels by checking the number of white pixels that are determined as being associated white pixels, and determining if a pixel being considered is one of bilevel pixels by checking the number of the black bilevel pixels and the number of the white bilevel pixels.

10 Claims, 4 Drawing Sheets

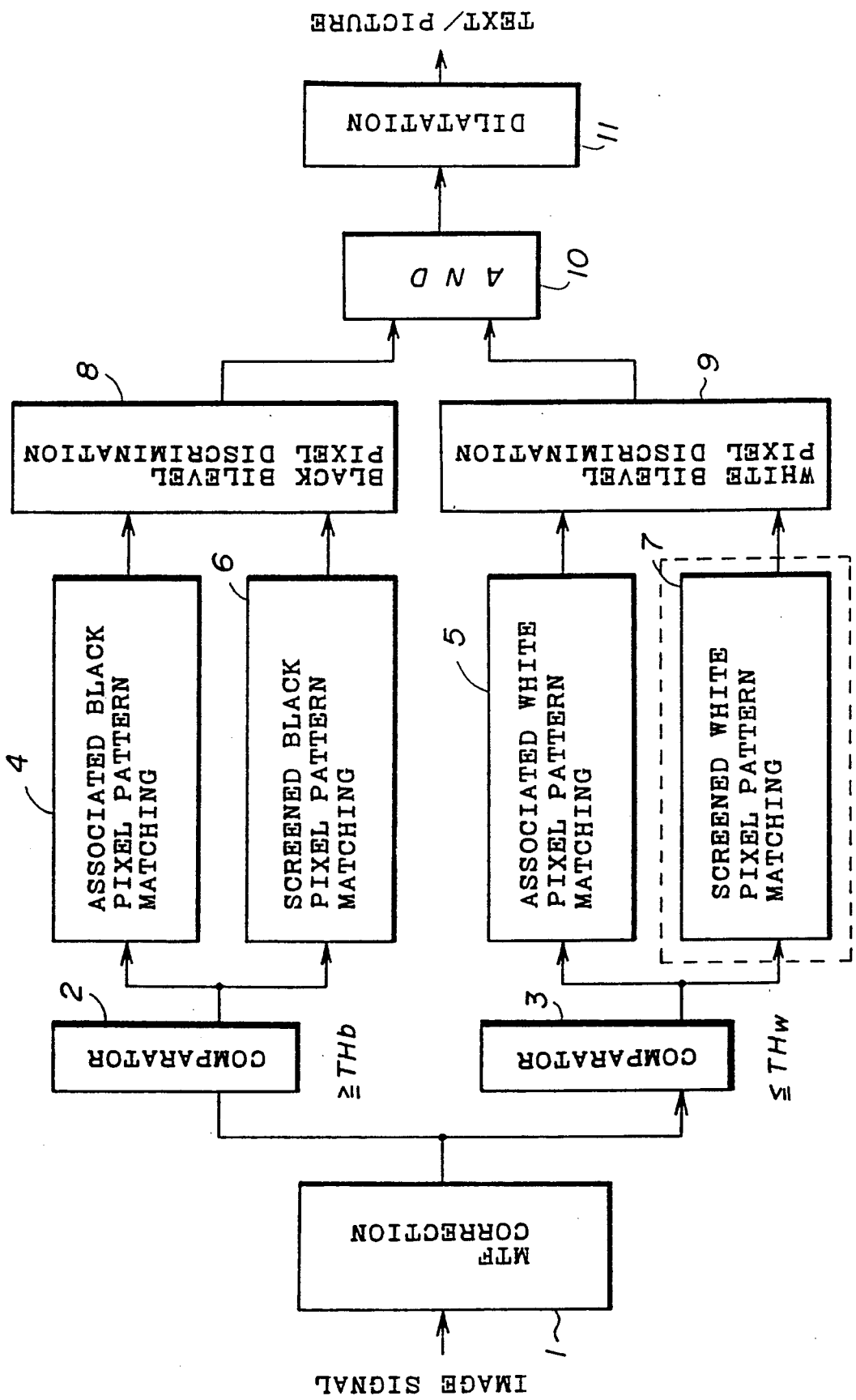

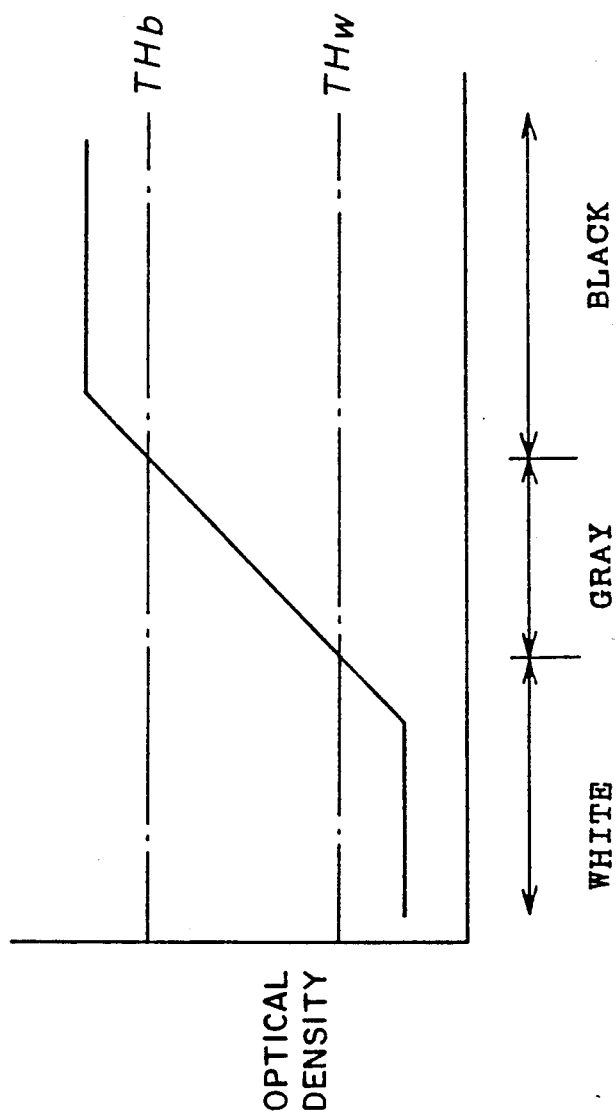

LINE REGION SEGMENTATION METHOD

BACKGROUND OF THE INVENTION

The present invention generally relates to a segmentation method, and more particularly to a line region segmentation method in which text or line regions are accurately discriminated from original image containing bilevel areas, continuous tone areas and screened halftone areas.

To reproduce high quality images by a digital copying machine or facsimile machine, it is preferable to use an adaptive image processing method for each of the line regions, continuous halftone regions and screened halftone regions which are contained in original images. As a preliminary step which must be carried out before such an image processing method is applied to each region to reproduce high quality images, it is necessary to accurately discriminate between line regions and screened/continuous halftone regions in original images of documents. Conventionally, a block adaptive thresholding (BAT) method has been used as a segmentation method for segmenting line regions from original images. This BAT method is disclosed, for example, in "Bilevel Rendition Method for Documents Including Gray-Scale and Bilevel Image" by N. Tetsutani et al. contained in a journal published by the Institute of Electronics and Communication Engineers of Japan (IECEJ). In a case in which this BAT method is used, an original image is divided into a plurality of blocks each having a prescribed size, and the maximum intensity (or optical density) level and the minimum intensity level for each of the blocks of the original image are detected. In these blocks, if a block has a difference in optical density between the maximum and minimum intensity levels that is greater than a predetermined threshold, then it is decided that the block is a line region or text region. If a block has a difference in optical density between the maximum and the minimum intensity levels that is not greater than the predetermined threshold, then it is decided that the block is a gray-scale region or picture region other than the text region. In this manner, the conventional BAT method has been used to discriminate between text regions and picture regions in original documents.

However, in a case in which the BAT method is applied, a segmentation of screened halftone areas is not performed, and there is a possibility that screened halftone areas of original images be erroneously determined as text regions. Therefore, in order to achieve accurate segmentation of original images when the BAT method is applied, in addition to the application of the BAT method, an additional segmentation process for segmenting screened halftone areas must be carried out. Thus, it is necessary to carry out a complicated method, and a relatively large, complicated system is required to achieve accurate segmentation, as compared with the conventional segmentation apparatus for performing only the simple BAT method.

Generally speaking, screened halftone areas are difficult to discriminate from non-screened areas when the area factor of screened halftone areas is around 50%. And, even when the BAT method is carried out in combination with the carrying out of the screened/non-screened area segmentation process, it is not easy to achieve accurate segmentation of line images from other images no matter what kinds of original images may be inputted. In addition, to detect the maximum intensity level and the minimum intensity level of each block, it is necessary that multilevel tone signals be directly processed. Thus, the conventional method as described above has a problem in that a relatively large, complicated system must be used to carry out the additional processing of multilevel tone signals when the block adaptive thresholding method is carried out.

SUMMARY OF THE INVENTION

Accordingly, it is a general object of the present invention to provide an improved segmentation method in which the above described problems are eliminated.

Another and more specific object of the present invention is to provide a segmentation method which can accurately discriminate between line regions (text areas) and dot regions (halftone areas) in original documents by means of a relatively small, compact segmentation apparatus. The above mentioned object of the present invention is achieved by a line region segmentation method comprising the steps of grouping pixels of an input image indicated by image signals into three sets of black, gray and white pixels, performing a first pattern matching of black pixels included in a region of the input image with a first set of predetermined matrix patterns on the basis of the image signals to determine whether a black pixel among the set of black pixels is closely associated with other pixels of the set of black pixels for each pixel of the set of black pixels, performing a second pattern matching of black pixels included in a region of the input image with a second set of predetermined matrix patterns on the basis of the image signals to determine whether a black pixel among the set of black pixels is one of screened black pixels in the input image for each pixel of the set of black pixels, making a determination as to whether the number of black pixels included in a given region that are determined as being associated black pixels and determined as being non-screened black pixels is greater than a predetermined reference value, so that it is decided that a black pixel being considered in the given region is one of black bilevel pixels when the number of black pixels is greater than the predetermined reference value, performing a third pattern matching of white pixels included in a region of the input image with a third set of predetermined matrix patterns on the basis of the image signals to determine whether a white pixel among the set of white pixels is closely associated with other pixels of the set of white pixels for each pixel of the set of white pixels, making a determination as to whether the number of white pixels included in a given region that are determined as being associated white pixels is greater than a predetermined reference value, so that it is decided that a white pixel being considered in the given region is one of white bilevel pixels when the number of white pixels is greater than the predetermined reference value, and making a line region discrimination by determining whether a pixel being considered in a given local area of the input image is one of bilevel pixels by checking if the number of the thus decided black bilevel pixels included in the given local area is greater than a predetermined number and if the number of the thus decided white bilevel pixels included in the given local area is greater than a predetermined number. According to the present invention, line pixels are discriminated through a pattern matching in which the structures of bilevel pixels and screened halftone pixels are considered, and therefore it is possible to accurately discriminate between text regions and picture regions (including continuous halftone and screened halftone regions) by means of a compact line region segmentation apparatus, thus reducing the manufacturing cost of the apparatus.

Other objects and further features of the present invention will become more apparent from the following detailed description when read in conjunction with the accompanying drawings.

BRIEF DESCRIPTION OF THE DRAWINGS

FIG. 1 is a block diagram showing a construction of a segmentation system to which a line region segmentation method according to the present invention is applied;

FIG. 2 is a diagram for explaining a grouping of pixels included in an input image into white, gray and black pixels by comparing the optical density of the pixels with two different threshold values;

DESCRIPTION OF THE PREFERRED EMBODIMENT

Figure 3D:
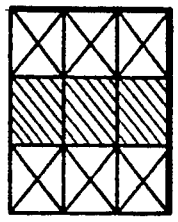
FIG. 3 is a diagram showing an example of pixel matrix patterns used fo discriminating associated black pixels.

First, a description will be given of the principle of the segmentation method according to the present invention. Bilevel images or text images which are composed primarily of black and white lines are different from continuous tone images and screened halftone images in that the bilevel images are usually composed of a number of closely associated black pixels having different lengths and a number of closely associated white pixels having different lengths. By making use of this feature of bilevel pixels, black pixels closely associated with other black pixels and white pixels closely associated with other white pixels can be detected by performing a pattern matching. It is difficult to detect screened halftone areas when the area factor of screened dots is equal to approximately 50%, as described above, however, it is rare for bilevel images including black pixels and white pixels to have an area factor of black pixels which is around 50%. Therefore, by making use of a structural difference between bilevel images and screened halftone images, screened black pixels and screened white pixels can be detected by appropriate pattern matching, respectively.

Usually, black pixels constituting part of black lines of a bilevel image are closely associated with other neighboring black pixels but do not constitute dots of screened black pixels. Therefore, by making use of the results of detecting closely associated black pixels and the results of detecting screened black pixels, it is possible to accurately detect black bilevel pixels which constitute black lines of the bilevel image. Similarly, white pixels constituting part of white lines of the bilevel image are closely associated with other neighboring white pixels but do not constitute dots of screened white pixels. Therefore, by making use of the results of detecting closely associated white pixels and the results of detecting screened white pixels, it is possible to accurately detect white bilevel pixels which constitute white lines of the bilevel image. In addition, bilevel images are usually composed of both black lines and white lines in a certain range of the image, but there is no case in which they are composed of either just black lines or just white lines. Therefore, by making use of this feature of bilevel images, it is possible to make a determination as to whether the pixel being considered is really a part of pixels of the bilevel images by determining whether the number of black bilevel pixels and the number of white bilevel pixels in a prescribed local region are greater than a predetermined reference number, respectively. Thus, it is possible to finally discriminate between text images and picture images (including screened halftone and continuous halftone images).

Generally, screened halftone dots are often composed of black pixels only, and therefore a step for discriminating screened white pixels will be omitted to simplify the segmentation method and reduce the cost of the apparatus. According to one aspect of the present invention, a step for discriminating screened white pixels is omitted from the segmentation method comprising a number of other steps, and thus the construction of a segmentation system is simplified. Also, according to the present invention, pixels included in an input image are first grouped into three different sets of pixels (black/gray/white pixels), having intensity levels distinctly different from one another, for use in subsequent steps, and therefore a simple processing method can be applied to the subsequent steps. In such a case, signals of gray pixels having intermediate intensity levels are eliminated, the segmentation method according to the present invention is not vulnerable to noises included in the signals of input images, and discrimination between several sets of pixels can be made accurately and reliably.

Figure 3C:
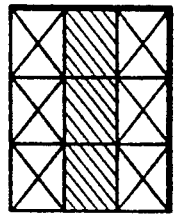
Figure 3B:
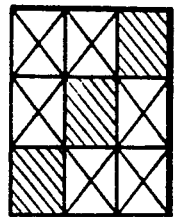
Figure 3A:
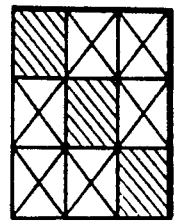
Figure 4D:
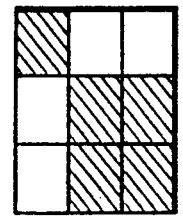
FIG. 4 is a diagram showing an example of pixel matrix patterns used for discriminating screened black pixels.
Figure 4C:
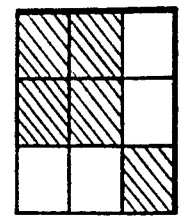
Figure 4B:
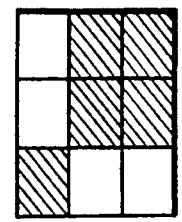
Figure 4A:
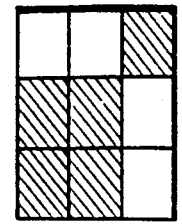
Figure 5D:
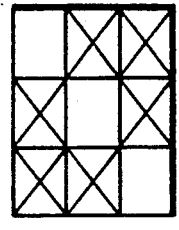
FIG. 5 is a diagram showing an example of pixel matrix patterns used for discriminating associated white pixels.
Figure 5C:
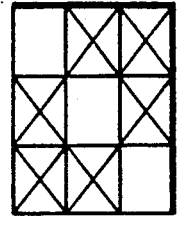
Figure 5B:
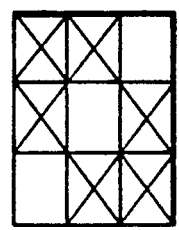
Figure 5A:
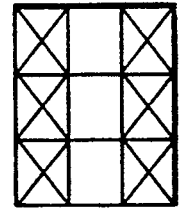

Next, a description will be given of an embodiment of a segmentation method according to the present invention, with reference to FIGS. 1 through 5.

FIG.1 shows an example of a segmentation system to which the segmentation method of the invention is applied. In this segmentation system as shown in FIG. 1, a MTF (modulation transfer function) correction part 1 performs a filtering of image signals being inputted by a scanner from original documents to carry out a MTF correction of the image signals. An example of a filter used in the segmentation method of the present invention for the MTF correction is represented by the following.

$$(\text{image signal}) \times \begin{bmatrix} & -1 & \\ -1 & +6 & -1 \\ & -1 & \end{bmatrix} \times 0.5$$

Comparators 2, 3 in the segmentation system shown in FIG.1, convert the image signals supplied from the MTF correction part 1 into three different sets of signals indicating black, gray and white pixels having discrete intensity levels. The comparator 2 carries out a bilevel rendition of the image signals by comparing the intensity of the image signals with a high threshold value THb which is used for detection of the black pixels. When the intensity of the image signals is higher than the high threshold value THb, it is decided by the comparator 2 that the image signals are indicating a set of black pixels, and the comparator 2 supplies signals indicating the set of black pixels. The comparator 3 also carries out a bilevel rendition of the image signals by comparing the intensity of the image signals with a low threshold value THw which is used for detecting white pixels. When the intensity of the image signals is not higher than the low threshold value THw, it is decided by the comparator 3 that the image signals are indicating a set of white pixels, and the comparator 3 supplies signals indicating the set of white pixels. In this manner, the image signals from the MTF correction part 1 are grouped by the comparators 2, 3 into the three following different sets of pixels:

1) black pixels having an intensity higher than the threshold THb,
2) gray pixels having an intermediate intensity between the thresholds THb and THw,
3) white pixels having an intensity lower than the threshold THw.

Then, the gray pixels having an intermediate intensity are eliminated from the pixels in the image signals, and thus the segmentation carried out by the present method is not vulnerable to noises included in the image signals and the reliability of discrimination performed by the respective circuits can be increased.

An associated black pixel pattern matching part 4 receives the signals indicating a set of black pixels from the comparator 2, and makes a determination as to whether each of the black pixels in the signals is closely associated with other neighboring black pixels. When one of associated black pixels is thus detected, an output signal of the pixel being considered is activated and outputted by the associated black pixel pattern matching part 4. This procedure is repeated for each of the black pixels included in the signals indicating the set of black pixels received from the comparator 2. A set of pixel matrix patterns used for detecting the associated black pixels are, for example, $3 \times 3$ pixel matrix patterns as illustrated in FIG. 3 (a) to (d). In FIG.3 (a) to (d), a shaded area denotes a black pixel and a cross marked area arbitrarily indicates either a black pixel or a white pixel. As shown in FIG.3, the associated black pixels of a bilevel image are straightly aligned in vertical, horizontal or diagonal directions, and such alignment patterns are utilized for the pattern matching of associated black pixels. When the black pixels match with any of the black pixel patterns shown in FIG.3, it is determined that the pixel at the center of the matrix is associated with the neighboring black pixels. This procedure is repeated for each of the black pixels included in the signals indicating the set of black pixels, and whether or not the pixel being considered is one of the associated black pixels is determined for all the black pixels included in the set of black pixels indicated by the signals received.

An associated white pixel pattern matching part 5 receives the signals indicating a set of white pixels from the comparator 3, and makes a determination as to whether each of the white pixels in the signals is closely associated with other neighboring white pixels. When one of the associated white pixels is thus detected, an output signal of the pixel being considered is activated and outputted by the associated white pixel pattern matching part 5. This procedure is repeated for each of the white pixels included in the signals indicating the set of white pixels received from the part 3. A set of pixel matrix patterns used for detecting the associated white pixels are, for example, $3 \times 3$ pixel matrix patterns as illustrated in FIG. 5 (a) to (d). In FIG. 5 (a) to (d), a blank area denotes a white pixel and a cross marked area arbitrarily indicates either a black pixel or a white pixel. As shown in FIG. 5, the associated white pixels of a bilevel image are straightly aligned in vertical, horizontal or diagonal directions, and such alignment patterns are utilized for the pattern matching of associated white pixels. When the white pixels match with any of the white pixel patterns shown in FIG. 5, it is determined that the pixel at the center of the matrix is associated with the neighboring white pixels. This procedure is repeated for each of the white pixels included in the signals indicating the set of white pixels, and whether or not the pixel being considered is one of the associated white pixels is determined for each of the white pixels included in the set of white pixels indicated by the signals received.

A screened black pixel pattern matching part 6 makes a determination as to whether each black pixel in the set of black pixels indicated by the signals supplied from the comparator 2 is one of screened black pixels or not. When the pixel being considered is one of the screened black pixels, an output signal of the pixel is activated and outputted by the screened black pixel pattern matching part 6. This procedure is repeated for each of the black pixels included in the set of black pixels indicated by the signals from the comparator 2. A set of pixel matrix patterns used for detecting the screened black pixels are, for example, $3 \times 3$ pixel matrix patterns as illustrated in FIG. 4 (a) to (d). In FIG. 4 (a) to (d), a blank area denotes a white pixel and a shaded area indicates a black pixel. As shown in FIG. 4, the area factor of screened black pixels in the pixel matrix patterns is around 50%. Bilevel pixels rarely have such an area factor of black pixels of around 50%. This area factor is utilized for the pattern matching of screened black pixels. When the black pixels match with any of the black pixel patterns shown in FIG. 4, it is determined that the pixel at the center of the $3 \times 3$ pixel matrix is one of the screened black pixels. This procedure is repeated for each of the black pixels included in the set of black pixels indicated by the signals supplied from the comparator 2. Whether or not the pixel being considered is one of screened black pixels is thus determined for each of the black pixels included in the set of black pixels indicated by the signals received from the comparator 2.

Figure 6D:
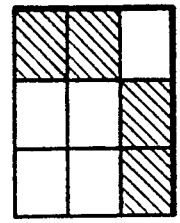
FIG. 6 is a diagram showing an example of pixel matrix patterns used for discriminating screened white pixels.
Figure 6C:
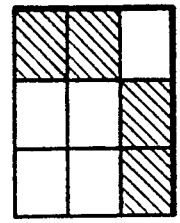
Figure 6B:
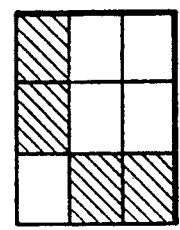
Figure 6A:
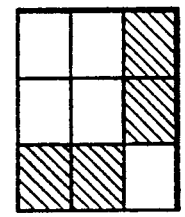

A screened white pixel pattern matching part 7 makes a determination as to whether each white pixel in the set of white pixels indicated by the signals supplied from the comparator 3 is one of screened white pixels or not. When the pixel being considered is one of the screened white pixels, an output signal of the pixel is activated and outputted by the screened white pixel pattern matching part 7. This procedure is repeated for each of the white pixels included in the set of white pixels indicated by the signals from the comparator 3. A set of pixel matrix patterns used for detecting the screened white pixels are, for example, $3 \times 3$ pixel matrix patterns as illustrated in FIG. 6 (a) to (d). In FIG. 6 (a) to (d), a shaded area denotes a black pixel and a blank area indicates a white pixel. As shown in FIG. 6, the area factor of screened white pixels in the pixel matrix patterns is around 50%. Bilevel pixels rarely have such an area factor of around 50%. This area factor is utilized for the pattern matching of screened white pixels. When the white pixels match with any of the pixel matching patterns shown in FIG. 6, it is determined that the pixel at the center of the pixel matrix is one of the screened white pixels. This procedure is repeated for each of the white pixels included in the set of white pixels indicated by the signals supplied from the comparator 3. Whether or not the pixel being considered is one of screened white pixels is thus determined for each of the white pixels included in the set of white pixels indicated by the signals received from the comparator 3.

A black bilevel pixel discrimination part 8 in the segmentation system shown in FIG. 1 carries out and AND operation between an active pixel (one of the associated black pixels) outputted by the associated black pixel pattern matching part 4 and a non-active pixel (one of the non-screened black pixels) outputted by the screened black pixel pattern matching part 6. In other words, when the pixel being considered is an associated and non-screened black pixel, an output signal of that pixel is activated and outputted by the black bilevel pixel discrimination part 8; when not, an output signal of the pixel is not activated. Then, the part 8 makes a determination as to whether the number of such active pixels within a prescribed region of the pixel matrix including the pixel being considered is greater than a predetermined reference value, so that it is determined that the pixel at the center of the pixel matrix is one of the black bilevel pixels. For example, when two or more active black pixels are detected in a $3 \times 3$ pixel matrix, it is determined that the pixel at the center of the pixel matrix is one of the black bilevel pixels.

A white bilevel pixel discrimination part 9 carries out an AND operation between an active pixel (one of the associated white pixels) outputted by the associated white pixel pattern matching part 5 and a non-active pixel (one of the non-screened white pixels) outputted by the screened white pixel pattern matching part 7. In other words, when the pixel being considered is an associated and non-screened white pixel, an output signal of that pixel is activated and outputted by the white bilevel pixel discrimination part 9; when not, an output signal of the pixel is not activated. Then, the part 9 makes a determination as to whether the number of such active pixels within a prescribed region of the pixel matrix including the pixel being considered is greater than a predetermined reference value, so that it is determined that the pixel at the center of the pixel matrix is one of the white bilevel pixels. For example, when two or more active white pixels are detected in a $3 \times 3$ pixel matrix, it is determined that the pixel at the center of the pixel matrix is one of the white bilevel pixels.

Using the discrimination results from the black bilevel pixel discrimination part 8 as well as the discrimination results from the white bilevel pixel discrimination part 9, an AND gate part 10 determines that the pixel at the center of the pixel matrix is one of bilevel pixels, when the number of black bilevel pixels within a predetermined local region is greater than a prescribed value and the number of white bilevel pixels there is greater than a prescribed value. For example, when two or more black bilevel pixels and two or more white bilevel pixels are found in a $5 \times 5$ pixel matrix, the AND gate part 10 determines that the pixel at the center of the $5 \times 5$ pixel matrix is one of the bilevel pixels.

It should be noted that the pixels which it is decided are bilevel pixels by the AND gate part 10 are limited to edge portion pixels lying at boundary portions between black pixels and white pixels, and a discrimination of the internal pixels of bilevel images is not made by the AND gate part 10. A dilatation part 11 carries out a dilatation of the discrimination results from the AND gate part 10, so that it is also decided that the internal pixels of bilevel images are bilevel pixels. When at least one pixel is found in a predetermined region (for example, in a $3 \times 3$ pixel matrix) which is determined as being one of the bilevel pixels by the AND gate part 10, the dilatation part 11 determines that the pixel at the center of the pixel matrix is one of the bilevel pixels. This dilatation step is repeated for all the bilevel pixels, and all the bilevel pixels, including the edge portion pixels and the internal pixels, are discriminated from other pixels contained in original images by the segmentation system according to the present invention. When the size of the pixel matrix used as the predetermined region is large enough, the dilatation step is not needed, but the dilatation step is especially required when the size of the pixel matrix is small.

According to one aspect of the present invention, the screened white pixel pattern matching part 7 can be omitted from the segmentation system, as indicated by a dotted line in FIG. 1. Generally, screened halftone images are composed of black pixels, and the results of discriminating screened white pixels supplied from the white bilevel pixel discrimination part 9 usually have no great influence upon the discrimination of white bilevel pixels performed by the white bilevel pixel discrimination part 9, even when the screened white pixel pattern matching part 7 is omitted from the segmentation system. Also, by means of the segmentation system as shown in FIG. 1, it is possible to carry out accurately and stably the segmentation between text regions and picture regions (including continuous and screened halftone regions), and the manufacturing cost of the segmentation system may be reduced. In combination with the segmentation system shown in FIG. 1, it is possible to use a prior screened halftone region segmentation apparatus for carrying out a dot region discrimination as well as a line region discrimination. Such a prior dot region segmentation apparatus and method is disclosed, for example, in Japanese Patent Application No.1-278559 which has been filed by the same applicant. A more accurate discrimination between dot regions and line regions can be attained by making use of the apparatus disclosed in the above mentioned prior application. A final determination of line regions in such a case is made when the segmentation apparatus of the present invention shown in FIG. 1 determines that a region is part of bilevel pixels and the apparatus as disclosed in the above prior application determines that the same region is part of non-screened pixels. And, the segmentation method according to the present invention may be applied to color image signals inputted by a scanner to the segmentation apparatus. In this case, the above described procedure is carried out respectively for red, green and blue signals obtained from original color images, or respectively for yellow, magenta and cyan signals of complement color signals corrected from the RGB signals.

As described above, the line region segmentation method of the present invention uses a unique pattern matching technique, which has been developed based on the structural difference between bilevel images and screened halftone images, for the discrimination of several pixels, including associated black/white pixels and screened black/white pixels. Accordingly, the segmentation method according to the present invention can accurately discriminate between bilevel images and picture images (including screened and continuous halftone images) by means of a compact, less complicated segmentation system.

Further, the present invention is not limited to the above described embodiment, and variations and modifications may be made without departing from the scope of the present invention.

What is claimed is:

1. A line region segmentation method comprising the steps of:

grouping pixels of an input image described by image signals into three sets of black, gray and white pixels;

performing a first pattern matching of black pixels included in a given region of said input image with a first set of predetermined matrix patterns on the basis of said image signals to determine whether a black pixel among said set of black pixels is closely associated with other pixels of said set of black pixels for each pixel of said set of black pixels;

performing a second pattern matching of black pixels included in a given region of said input image with a second set of predetermined matrix patterns on the basis of said image signals to determine whether a black pixel among said set of black pixels is one of screened black pixels in said input image for each pixel of said set of black pixels;

making a determination as to whether the number of black pixels included in a given region that are determined as being associated black pixels and determined as being non-screened black pixels is greater than a predetermined reference value, so that it is decided that a black pixel being considered in said given region is one of black bilevel pixels when said number of black pixels is greater than said predetermined reference value;

performing a third pattern matching of white pixels included in a given region of said input image with a third set of predetermined matrix patterns on the basis of said image signals to determine whether a white pixel among said set of white pixels is closely associated with other pixels of said set of white pixels for each pixel of said set of white pixels;

making a determination as to whether the number of white pixels included in a given region that are determined as being associated white pixels is greater than a predetermined reference value, so that it is decided that a white pixel being considered in said given region is one of white bilevel pixels when said number of white pixels is greater than said predetermined reference value; and making a line region discrimination by determining whether a pixel being considered in a given block of said input image is one of bilevel pixels by checking if the number of the thus decided black bilevel pixels included in said given block is greater than a predetermined number and if the number of the thus decided white bilevel pixels included in said given block is greater than a predetermined number.

2. The method as claimed in claim 1, further comprising the step of performing a dilatation after said line region discrimination is made, so that line regions including not only edge pixels located at edge portions of bilevel images but also internal pixels located inside said bilevel images are segmented from said input image.

3. The method as claimed in claim 1, wherein said three sets of black, gray and white pixels are supplied from two comparators having respectively high and low threshold values which are predetermined, said three sets being supplied after an optical density of each of the pixels of said input image is compared with said high threshold value of one of said two comparators and the same is compared with said low threshold value of the other comparator.

4. The method as claimed in claim 3, wherein said set of gray pixels are eliminated from said pixels of said input image for which said pattern matching is performed, each pixel of said set of gray pixels having an intermediate optical density between said two threshold values, and no pattern matching being performed for said set of gray pixels, thus reducing influence of noises included in said image signals.

5. The method as claimed in claim 1, wherein each matrix pattern of said second set of predetermined matrix patterns have an area factor of black pixels which is approximately equal to 50 percent.

6. A line region segmentation method comprising the steps of:

grouping pixels of an input image described by image signals into three sets of black, gray and white pixels;

performing a first pattern matching of black pixels included in a given region of said input image with a first set of predetermined matrix patterns on the basis of said image signals to determine whether a black pixel among said set of black pixels is closely associated with other pixels of said set of black pixels for each pixel of said set of black pixels;

performing a second pattern matching of black pixels included in a given region of said input image with a second set of predetermined matrix patterns on the basis of said image signals to determine whether a black pixel among said set of black pixels is one of screened black pixels in said input image for each pixel of said set of black pixels;

making a determination as to whether the number of black pixels included in a given region that are determined as being associated black pixels and determined as being non-screened black pixels is greater than a predetermined reference value, so that it is decided that a black pixel being considered in said given region is a black bilevel pixel when said number of black pixels is greater than said predetermined reference value;

performing a third pattern matching of white pixels included in a given region of said input image with a third set of predetermined matrix patterns on the basis of said image signals to determine whether a white pixel among said set of white pixels is closely associated with other pixels of said set of white pixels for each pixel of said set of white pixels;

performing a fourth pattern matching of white pixels included in a given region of said input image with a fourth set of predetermined matrix patterns on the basis of said image signals to determine whether a white pixel among said set of white pixels is one of screened white pixels in said input image for each pixel of said set of white pixels;

making a determination as to whether the number of white pixels included in a given region that are determined as one of associated white pixels and determined as one of non-screened white pixels is greater than a predetermined reference value, so that it is decided that a white pixel being considered in said given region is a white bilevel pixel when said number of white pixels is greater than said predetermined reference value; and making a line region discrimination by determining whether a pixel being considered in a given block of said input image is one of bilevel pixels by checking if the number of the thus decided black bilevel pixels included in said given block is greater than a predetermined number and if the number of the thus decided white bilevel pixels included in said given block is greater than a predetermined number.

7. The method as claimed in claim 6, further comprising the step of performing a dilatation after said line region discrimination is made, so that line regions including not only edge portion pixels located at edge portions of bilevel images but also internal pixels located inside said bilevel images are discriminated from said input image.

8. The method as claimed in claim 6, wherein said three sets of black, gray and white pixels are supplied from two comparators in which high and low thresholds are predetermined by comparing an optical density of each of the pixels of said input image with said high threshold of one of said comparators and comparing the same with said low threshold of the other comparator.

9. The method as claimed in claim 8, wherein said set of gray pixels are eliminated from said pixels of said input image for which said pattern matching are performed, each pixel of said set of gray pixels having an intermediate optical density between said two threshold values, and no pattern matching being performed for said set of gray pixels, thus allowing influence of noises included in said image signals to be reduced.

10. The method as claimed in claim 6, wherein each matrix pattern of said second and fourth sets of predetermined matrix patterns have an area factor of black pixels which is approximately equal to 50 percent.

* * * * *